Patented Sept. 8, 1942

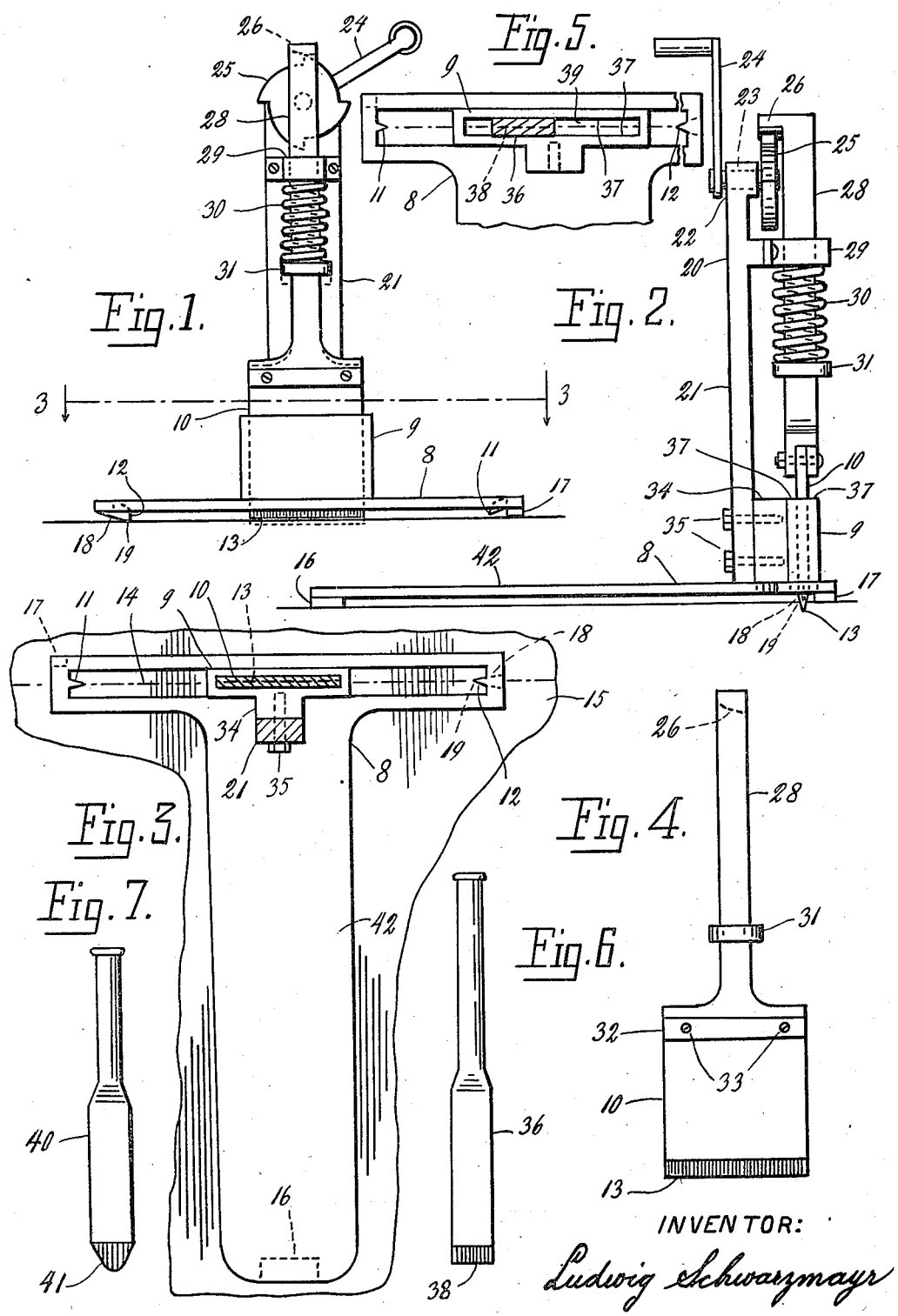

2,295,186

UNITED STATES PATENT OFFICE 2,295,186

SURVEY MARKING DEVICE

Ludwig Schwarzmayr, San Francisco, Calif.

Application July 18, 1941, Serial No. 403,025

8 Claims. (Cl. 33—189)

My invention relates to survey marking devices; and the principal object of the invention is to provide a device with which permanent survey marks on hard surfaces such as concrete pavements and the like can be made very accurately and distinctly even by an unskilled person.

Another object is a construction with which an accurate and straight mark can be cut on a surface having deep depressions.

A further object is to provide means facilitating positioning the device on an initial survey mark.

I attain these objects by the construction illustrated in the accompanying drawing, in which—

Figure 1 is a front elevation of the device.

Fig. 2 is a side elevation of the device.

Fig. 3 is a section on line 3—3 in Fig. 1.

Fig. 4 shows the cutter after it is removed from the guide.

Fig. 5 is a plan view of part of the device after the removal of the cutter and reciprocating mechanism, a hand operated cutter of a modified dimension is shown in section.

Fig. 6 is the hand operated cutter shown in Fig. 5.

Fig. 7 shows a hand operated cutter having a lancet-shaped cutting edge, and is adapted to the guide similarly as the cutter shown in Fig. 5.

The base 8 supports a vertical guide 9, in which is slidingly mounted the cutter 10. Spaced sight members 11 and 12 are in alignment with the cutting edge 13 of the cutter 10. By this arrangement the alignment of the long cutting edge 13 of the cutter with an initial survey mark, illustrated by the dot and dash line 14, on the pavement 15, is facilitated.

I provide the base with three angularly arranged bearings or toes 16, 17 and 18. The bearing 18 is in alignment with the cutting edge 13 of the cutter 10, and with the sight members 11 and 12. The point 19 of the toe or bearing 18 is coincident with the sight member 12. In positioning the device the point 19 of the toe is placed on the initial survey mark 14 and serves as pivot in adjusting the other part of the device to align the sight member 11 with the survey mark 14.

For use of the device under normal conditions I provide the device with cutter reciprocating mechanism, generally indicated by reference character 20. The standard 21 has a bearing in which turns the shaft 23, which is provided at one end with a handle 24 and at the other with a cam wheel 25, which engages the cam follower 26 on the bar 28, to the lower end of which is secured the cutter 10. The bar 28 is slidingly mounted in the guide 29, and a spring 30 bearing with its upper end against the guide 29 and with its lower end against the collar 31 on the bar imparts cutting action to the cutter. At the lower end of the bar 28 is formed a body to which is removably secured the cutter 10 by means of a plate 32 and the screws 33.

I secure the standard 21 to the member 34 of the base 8 with screws 35, so that the reciprocating mechanism 20 and the cutter can be removed from the device. When marks are to be made on very uneven surfaces hand operated cutters, as are shown in Figs. 6 and 7, can be used to advantage in the device. The cutter 36 of Fig. 6 is shown in Fig. 5 in section. The long sides 37—37 of the guide 9 align the cutting edge 38 of the cutter 36 with the sight members 11 and 12 when adjusted in cutting operation to various positions in the elongated guide way 39. In the elongated guide way the cutter is adapted to be positioned with its entire cutting edge 38 to contact with an inclined surface. The cutter 40 of Fig. 7 is of a similar cross section as the cutter 36 and its cutting edge 41 is held in alignment with the sight members 11 and 12 when used in the guide way 39, and when so used very accurate survey marks can be made on surfaces having deep depressions.

An extended member 42 of the base 8 provides a bearing for the foot or the knee of an operator, whereby the device can be held in position during cutting operation.

I claim:

1. In a survey marking device, a base, a vertical guide supported by said base, a long-edged cutter retained by said guide with cutting edge in a fixed direction with respect to said base during cutting operation, said base being adapted to be positioned on the surface of a pavement to align the cutting edge of said cutter with an initial line of a survey mark.

2. In a survey marking device, a base, a vertical guide supported by said base, a long-edged cutter retained by said guide with cutting edge in a fixed direction with respect to said base, said base being adapted for positioning on a pavement to align the cutting edge of said cutter with an initial line of a survey mark and having a member extending away from said guide to accommodate the foot or knee of an operator for retaining the device in its original position in respect to an initial line of a survey mark during cutting operation.

3. In a survey marking device, a base provided with a survey mark line sight in a plane substantially corresponding with the plane of the bearing of the base for adjusting the device in respect to an initial line of a survey mark on a pavement and the like, a vertical guide supported by said base, and a long-edged cutter retained by said guide with cutting edge in alignment with said survey mark-line sight.

4. In a survey marking device, a base provided with a survey mark line sight in a plane substantially corresponding with the plane of the bearing of the base and comprising two spaced sight elements, a vertical guide supported by said base, and a long-edged cutter retained by said guide with cutting edge in alignment with the said sight elements.

5. In a survey marking device, a base having a survey mark line sight in a plane substantially corresponding with the plane of the bearing of the base, a vertical guide supported by said base, a long-edged cutter retained by said guide with cutting edge in alignment with said sight, said base having a member extending away from said guide to accommodate the foot or knee of an operator for retaining the device with said sight in alignment with an initial line of a survey mark during cutting operation.

6. In a survey marking device, a base having a survey mark line sight in a plane substantially corresponding with the plane of the bearing of the base, a vertical guide supported by said base and being formed by a guide-way of elongated cross-section, a long-edged cutter slidable in said guide-way and having a body of less length in cross-section than the length of said guide-way in cross-section to be adjustable to various cutting positions in the guide-way but retained thereby with cutting edge in alignment with said survey mark line sight during adjustment to various cutting positions.

7. In a survey marking device, a base having a survey mark line sight in a plane substantially corresponding with that of the bearing of the base and comprising two-spaced sight elements, a vertical guide supported by said base, a long-edged cutter retained by said guide with cutting edge in alignment with said sight elements, said base having a toe coincident with one of said sight elements for facilitating alignment of said sight with an initial line of a survey mark on a pavement and the like.

8. In a survey marking device, a base, a vertical guide supported by said base, a long-edged cutter retained by said guide with cutting edge in a fixed direction with respect to said base, a reciprocating mechanism supported by said base and operatively engaging said cutter, said base having a member extending away from said guide to accommodate the foot or knee of an operator for retaining the device with cutting edge of said cutter in its original relation with an initial line of a survey mark on a pavement and the like during operation of said reciprocating mechanism.

LUDWIG SCHWARZMAYR.